United States Patent [19]

Dansbach et al.

[11] 4,127,845
[45] Nov. 28, 1978

[54] COMMUNICATIONS SYSTEM

[75] Inventors: David J. Dansbach, Henrietta; James E. Snyder, Rochester, both of N.Y.

[73] Assignee: General Signal Corporation, Rochester, N.Y.

[21] Appl. No.: 723,104

[22] Filed: Sep. 13, 1976

Related U.S. Application Data

[63] Continuation of Ser. No. 516,849, Jan. 10, 1975, abandoned.

[51] Int. Cl.² ............................................. H04Q 9/00
[52] U.S. Cl. ............................. 340/151; 340/147 LP; 340/163
[58] Field of Search ................. 340/147 LP, 163, 152, 340/408, 409, 413, 151, 146.1 C

[56] References Cited

U.S. PATENT DOCUMENTS

| 3,328,758 | 6/1967 | Brothman | 340/146.1 C |
| 3,449,717 | 6/1969 | Smith | 340/146.1 C |
| 3,613,078 | 10/1971 | Manning | 340/146.1 C |
| 3,753,228 | 8/1973 | Nickolas | 340/146.1 D |
| 3,796,994 | 3/1974 | Nuss | 340/163 |
| 3,839,707 | 10/1974 | Woodward | 340/409 |

Primary Examiner—Harold I. Pitts
Attorney, Agent, or Firm—Pollock, Vande Sande & Priddy

[57] ABSTRACT

A telemetry and control system is disclosed which allows a control office to communicate with a plurality of remote field stations over a preferably duplex communication channel. Transmissions, both controls and indications are formatted as messages comprising a number of words. The first word comprises the address of a selected field station to which the controls are, or have been, directed. A variable number of control words or indications and a check word or words conclude the message.

17 Claims, 11 Drawing Figures

COMMUNICATIONS SYSTEM

REFERENCE TO RELATED APPLICATION

This application is a continuation of Ser. No. 516,849, filed Jan. 10, 1975 now abandoned.

FIELD OF THE INVENTION

The present invention relates to a communication system, and more particularly a communication system which performs control and telemetry functions. Systems of the type disclosed herein find utility in a wide variety of applications, although they have found particular utility in the railroad context.

BACKGROUND

Communications systems which are generally similar to the instant invention are well known to the prior art. Usually the system includes a central or master station which communicates in a regular order with a plurality of remote field stations. The information flow may be over line wires or the signals may be radiated. The master station establishes a regular order of communicating with each of the remote field stations. Remote field stations may be transmitted to sequentially although other orders may be desirable. The information transmitted by the master station comprises orders for the field stations to execute and these orders are termed controls. At the field station, the received control messages are made available to the utilization apparatus through an interface. In turn, on request the field stations will transmit information to the master station respecting the status of the apparatus at the field station. This information is referred to as indications. The general operating sequence is for the master station to establish a regular communication cycle in which it transmits to each of the field stations. Each of the field stations, on reception of a message directed to it, in turn, transmits indications back to the master station.

Applications for systems of the general type referred to above, usually require high security in the messages. That is, the messages, as received, must be substantially error free, and this is especially true for the controls as received by the field stations. In order to assure high reliability of the controls received by the field stations the prior art has established an operating sequence known as select, check, execute. In this sequence, the master station transmits a series of controls to a particular field station. When these controls are received they are transmitted back to the master station, by the field station, as indications. The indications received by the master station are then checked against the controls transmitted by the master station and, if they agree, the master station sends out an additional control message which orders the field station to execute the previously received controls. Although this system does insure high reliability of control messages before they are executed by the field station, those with ordinary skill in the art will understand that the necessity for two transmissions by the master station before a particular set of controls can be executed, reduces the information transmitting capability of the system.

The prior art also illustrates a plurality of types of signals which may be made available to the application circuits, at the field station, through the interface. In one type, the received controls are continually available until such time as another control message is received to cancel a particular control. Alternatively, the system may be arranged so that each of the controls is available only during the period when a message is being received. A system of the foregoing type is described in a manual entitled GRS Code System 4000 Operation and Maintance, Phamplet 1292, revised February 1971. The former type of control is generally referred to as a latch, while the latter type of control is generally referred to as a pulse. Due to the signal requirements of application circuits within a system and even within a particular field station, the inability to selectively supply either pulse or latch outputs is a disadvantage which requires additional complexity in the application circuits. In addition, the pulse type controls available have a predetermined duration, that is the duration of reception of a message. Although the prior art has overcome the disadvantages referred to above, it is only done so with the addition of further complexity in the application circuits.

Many systems are capable of identifying a failure at a particular field station when, for instance, that particular field station fails to respond to transmissions to it, or when a particular field stations transmission is obviously garbled. However, when a particular field station is identified as having failed, the master station may not be capable of exerting any further control over the application circuits located at the particular field station. In some situations it is necessary to effect action at a field station when a communication failure is detected. Obviously the master station may be unable to effect this action.

In some applications it may be desirable to enable control of a particular application circuit, or a group of applications circuits by a particular one of a plurality of control stations. For example, two field stations may occupy the same geographic location; the interfaces of each would enable control of a particular application circuits or a group of application circuits. The two field stations may be controlled by respectively a first and second control office. In the prior art, it has been suggested, that to enable mutual cooperation of the control offices to ensure that one of the control offices exerts control while the other does not, a separate communication path be established between the control offices. The obvious disadvantage to this solution lies in the necessity for an additional communication path which, otherwise would not be necessary. Of course, if a particular output of each of the field stations were tied together the output would be effective if both field stations would achieve the same control for that particular output. This, however, requires both control offices to transmit, and both field stations to receive, the identical control. This redundancy is wasteful of communication time and equipment and does not offer a realistic solution to the problem for a communication path would still be necessary between the control offices to assurre that the controls arrived at the field stations in time synchronism to avoid the possibility of the two outputs being in different states at the same time.

SUMMARY OF THE INVENTION

The present invention overcomes the foregoing and other disadvantages exhibited in the prior art in a manner to be explained hereinafter. To avoid the necessity for the select, check and execute scheme of the prior art and the necessity for double transmissions for a single control, the present invention employs a pair of memory means in cooperation with the receiver at any field station. The received control messages are loaded into a first memory means in substantial time synchronism with their reception. During the reception one or more checking circuits can be operated to determine the reliability of the message. At the conclusion of the message, if the checking circuits indicate that the reception was reliable, the control message, which is completely stored in the first memory means, is transferred to a second memory means which contains a corresponding bit position for each of the bits in the first memory means. The transfer, which is controlled by the checking apparatus, indicates that the received message is reliable. The second memory means directly controls the application circuits.

The interface of each receiver can selectively make available pulse or latched outputs. Furthermore, some of the control bits can be made available as pulse outputs. To provide this capability the following sequence takes place after reception of a valid message at a field station. After the transfer of the control message from the first memory means to the second memory means is made, the first memory means is cleared, i.e., each and every bit position is set to logic zero. Of course, as soon as the control message has been transferred from the first memory means to the second memory means, it is available at the field station interface to the utilization apparatus (application circuits). After a predetermined period of time, which is selectable at each of the field stations, the following operation takes place to terminate those outputs which have been selected to be of the pulse type. A circuit is prepared for those bit positions in the second memory means which relates to outputs which have been selected to be of the pulse type for transfer from the first memory means. Of course, at this time each bit position in the first memory means is at a logic zero conditon. After the predetermined period which has been selected for the duration of the pulse output, a second transfer is made from the first memory means to the second memory means over the previously referred to prepared circuit. Thus, for each bit position in the second memory means which is prepared for a pulse type output, the transfer from the first memory means drives that bit position to a logic zero condition. As a result, the output controls for each of those bit positions then changes to a logic zero. The remaining bit positions, of course, are unaffected by the second transfer and thus provide the latch type outputs.

In order to enable a particular application circuit to be controlled by one of two interfaces each associated with different receivers, each of which is controlled by different control offices an output is available for each bit position through a tri-level gate. A tri-level gate is a gate which is capable of assuming three distinct conditions. Two of these conditions are logic one and logic zero level, which are well known to those skilled in the art. The third condition is a high impedance state. A first interface, controlled by a first receiver which is responsive to communications from a first control office may have a particular bit position available at the output of a tri-level gate tied to a particular application circuit. At the point of connection between the tri-level gate of the first interface and the application circuit, a second tri-level gate is also connected, which second tri-level gate corresponds to a particular bit position of a second interface which is associated with a second field station which is controlled by a second control office. Naturally, the two field stations would be located at the same geographic location. The first control office, in addition to controlling the first interface and therefore the first tri-level gate to either a logic one logic zero level, is also capable of controlling the second tri-level gate associated with the second interface to its high impedance condition. Likewise, the second control office can control either the logic one or logic zero level of the second interface and there through the second tri-level gate but it also has the capability of controlling the high impedance state of the first tri-level gate. Therefore, if the second control office is to control the application circuit it is only necessary for it to transmit, in the particular bit position associated with the second tri-level gate, the particular control which is to be effective and also transmit a control which is effective to control the first tri-level gate to its high impedance state. Thus, the particular logic level of the first tri-level gate will have no effect on the operation of the second tri-level gate and the response of the application circuit. Of course, the first control office can, likewise, control the high impedance state of the second tri-level gate so that the first tri-level gate may impose its logic condition on the application circuit without interference from the second tri-level gate. In this manner, either the first or the second control office can control the particular application circuit without requiring additional communication paths between these two control offices. It should be apparent, that through the use of this apparatus, the previous condition of the bit position in the non-controlling interface, will not interfere with the controlling bit position in applying its logic level to the application circuit.

Finally, the inventive apparatus also provides an alarm circuit for indicating, at a respective field station, the condition of its associated apparatus. The alarm circuit, when indicating a failure condition of the communication apparatus, may be arranged to control the condition of one or more of the application circuits located at the field station to a distinctive condition in response to the failure indication. Another desirable function that can be performed by the alarm circuit is to disable the associated field station transmitter. Thus, the failure can be acted on at the field station without requiring intervention of the control office. As has been explained above, the communication sequence is initiated at a particular field station when it is addressed by the control office. This operation initiates operations of the field station transmitter to transmit back to the control office. The maximum communication cycle between transmissions to any particular field station can be specified. That is, one can specify the maximum time lapse between communications with the same field station. A timer is reset by operation of the field station transmitter, and the timer has a delay time which is of the same order of magnitude as the communication cycle. Thus, so long as the field station transmitter operates within the maximum communication cycle time, the timer cannot be set. However, if the field station receiver fails, if the field station logic fails or if the field station transmitter fails, the field station transmitter will not transmit as often as is required to maintain the timer reset. When the timer becomes set, the alarm circuit is initiated to indicate a failure in the communications system. Since each field station has its own timer they can be adjusted to time out different periods so the failure of a critical station can be detected without requiring each field station to have the same communication cycle. This clearly allows a great deal of flexibility while maintaining close control.

Thus, the inventive apparatus overcomes a number of the problems and disadvantages exhibited by prior art communication systems while at the same time maintaining reliability of communications between the control office and each of the field stations. Other features, advantages and characteristics of the present invention will become apparent from a reading of the following description which discloses a preferred embodiment of the invention.

BRIEF DESCRIPTION OF THE DRAWINGS

This description, when taken in conjunction with the attached drawings provides a description of a preferred embodiment of our invention. In the drawings like reference numerals identify identical apparatus;

FIG. 2b is a schematic diagram of a portion of the transmit logic and control of FIG. 2a;

FIG. 2c is a schematic diagram of another portion of the components of transmit logic and control of FIG. 2a;

FIG. 2d illustrates the timing of certain signals;

FIG. 3b and FIG. 3c are schematic diagrams of two embodiments of the block diagram of FIG. 3a;

DETAILED DESCRIPTION OF PREFERRED EMBODIMENTS

Figure 1:
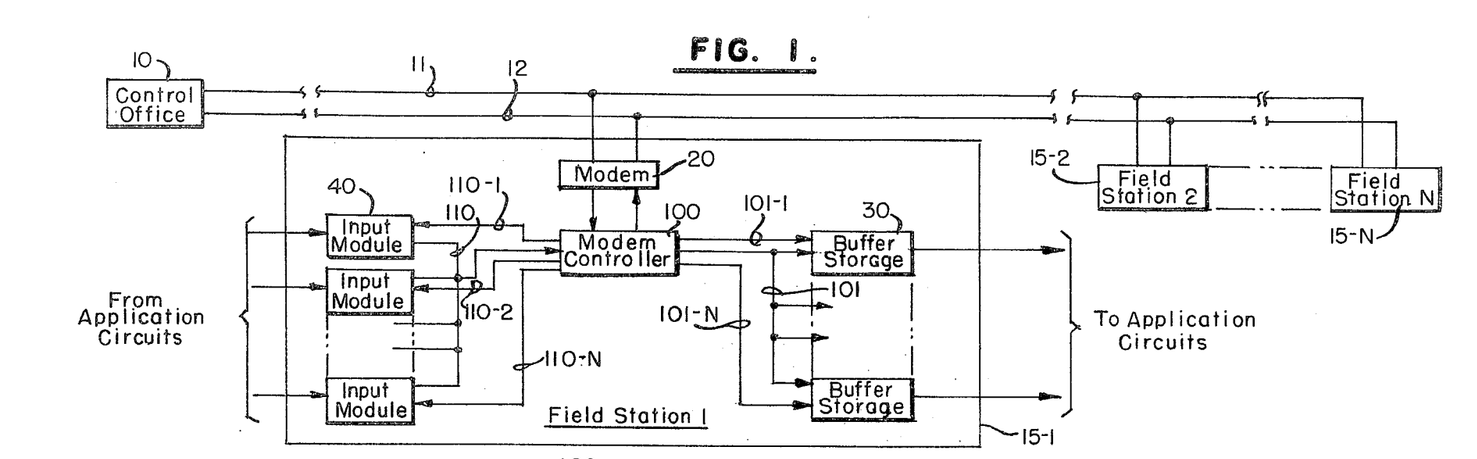
FIG. 1 is a block diagram of the inventive communication system.

FIG. 1 is a block diagram of a communication system incorporating our invention. In particular, FIG. 1 illustrates a control office 10 which is connected to communication channels 11 and 12. Those of ordinary skill in the art will understand that each of the channels 11 and 12 may represent a pair of line wires. A plurality of field stations, including field stations 1 through field station N, are connected to the communication channels. Although line wires may be used those of ordinary skill in the art will understand that radio wave communication can be used as well in accordance with the principles of our invention. Communication channels 11 and 12 are illustrated as broken to represent geographical separation between the control office and each of the respective field stations. A typical field station 15-1 is illustrated in more detail in FIG. 1. In particular it comprises a modem 20, a modem controller 100, a plurality of buffer storages 30 and a plurality of input modules 40.

The modum 20 is connected to both communication channels 11 and 12 for full duplex capability. The particular modem and communication channel selected is not critical and these may be any of a wide variety of devices. Those with ordinary skill in the art will be able to choose suitable apparatus after reading this application. The modem controller 100 receives data from the modem 20 and provides data to the modem 20 for transmission over the communication channel. The information received by the modem controller 100 is provided to one or more of the buffer storages 30 as determined by the modem controller 100. In addition, when the field station 15-1 is to transmit, the information that is transmitted is derived from one or more of the input modules 40, also as controlled by the modem controller 100. The field stations outputs derived from one or more of the buffer storages 30 may be provided to application circuits, as indicated. Furthermore, the information for transmission to the control office is available from the application circuits to one or more of the input modules 40 to the modem controller 100.

Each of the field stations 15 is identified by a unique address. The number of bits in the address depends, of course, on the number of field stations that are contemplated in the system. In one embodiment built in accordance with our invention a system is capable of uniquely identifying one of 62 field stations using a six bit address. In the normal method of operation the control office 10 addresses a message to a particular field station by transmitting the address of the field station. Each of the field stations continually monitors the line and when the transmitted address is recognized by a particular field station that field station's transmitter is initiated. The field station may operate in either of two modes, full indication transmissions or indications transmitted on detection of indication changes. In the first mode of operation, when a field station recognizes its address, it transmits back to the control office, its address and each of the inputs available from the input modules 40 indicating the condition of the application circuits at that field station at that time. The indications are grouped into words of uniform bit length and the indication words are transmitted in sequence. Each indication word may include start and stop bits as well as parity bits. Finally, in order to provide high security we employ a polynomial check for both indications and controls. The check circuit at each field station, at the conclusion of the transmission of the indication words transmits one or more check words for reception by the control office.

In the change detection mode of operation indications are transmitted back to the control office only if the field station determines that an indication status has changed from the last transmission. If no indication changes are detected then the field stations transmission concludes with the transmission of its address and the associated check word or words.

Simultaneously with the transmission sequence referred to above, the field station may also receive a plurality of control words from the control office. Each control word comprises a uniform number of bits, which may include start bits, stop bits and parity bits in addition to control bits. The modem controller 100 determines where in a buffer storage 30 each of the control bits is to be routed to as well as which of the buffer storages 30 are to be provided with the control bits. The number of control words may vary with the identity of the field station being transmitted to and, some transmissions may include no control words at all. Whether or not control words are included, the message from the control office concludes with one or more check words, for the polynomial check operation referred to previously. After the modem controller 100 has determined validity of the message, the control bits are made available to the application circuits through one or more of the buffer storages 30.

Our invention is particularly directed to the manner in which the control bits are made available to the application circuits so as to obviate the necessity for the select, check, execute sequence, to make available pulse or latch type outputs, to allow a plurality of control offices to alternatively control the identical application circuit and to provide an alarm indication at a field station to indicate a failure in the communication apparatus.

The particular apparatus which forms our invention will become clear from the following discussion which is related more particularly to the modem controller 100 and the buffer storage 30.

The modem controller 100 makes available to each of the buffer storage devices 30 data which is received by modem 20. This data is made available in common to each of the buffer storages devices 30 over cables 101. Those of ordinary skill in the art will understand that the cable 101 illustrated in FIG. 1 represents a number of conductors as an entire word is presented at one time in parallel. In addition, modem controller 100 selects the particular buffer storage 30 which will respond to the data by providing a signal over one of the conductors 101-1 through 101-N. In addition, address signals from modem controller 100 provided to each of the buffer storage devices 30, direct the storage of the data to a particular storage location in the buffer storage 30, as will become more clear hereinafter.

On the transmit side the modem controller 100 accepts data from one of the input modules 40 over cables 110. Which particular input module 40 which will be allowed to present indications to the modem controller 100 is selected by energizing one of the conductors 110-1 through 110-N. As was the case for the cables 101 the cable 110 represents a plurality of conductors inasmuch as each input module 40 presents an entire indication word, in parallel, to the modem controller 100, when selected.

Figure 2A:
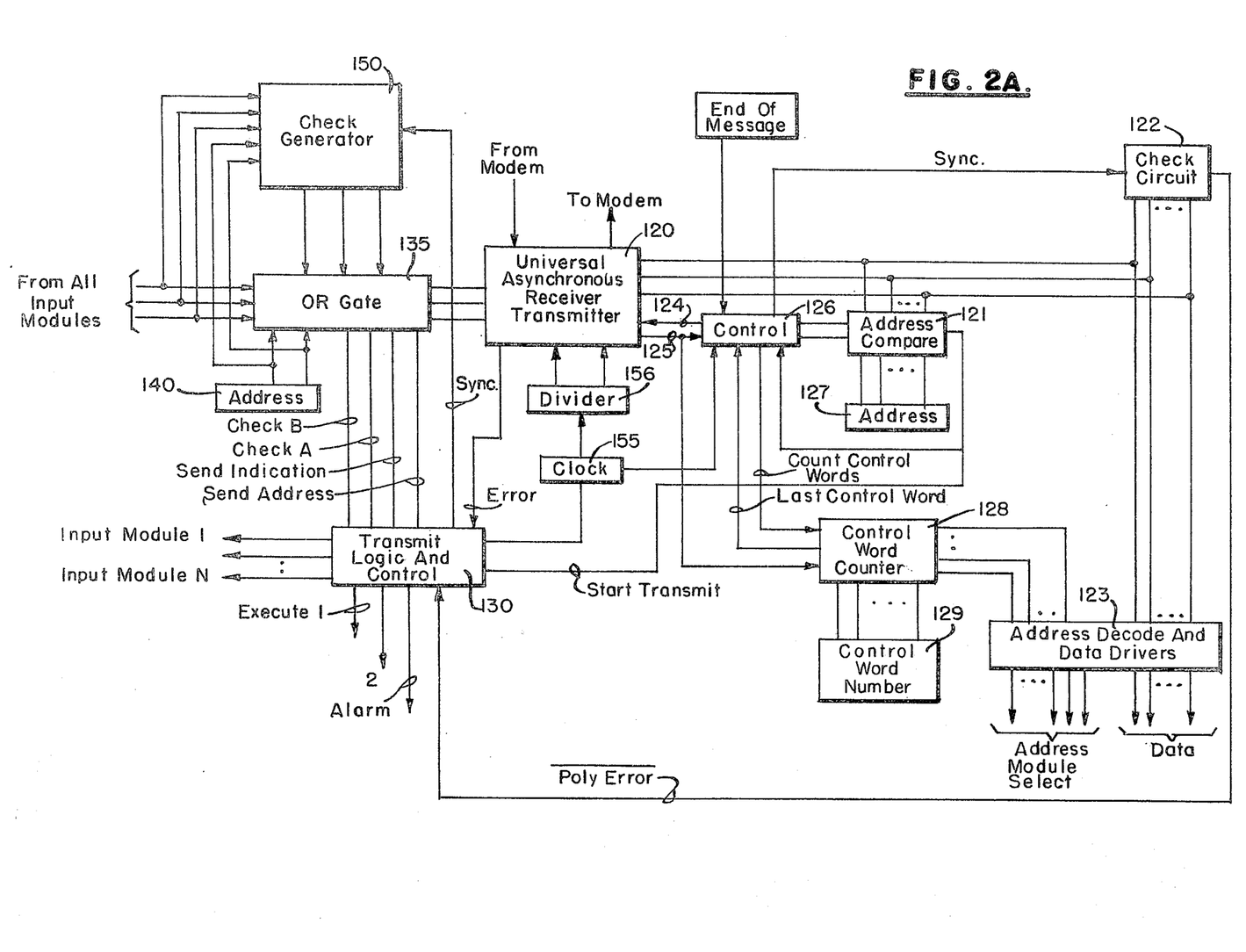
FIG. 2a is a detailed block diagram of the modem controller shown in FIG. 1.

A detail block diagram of modem controller 100 is shown in FIG. 2a. The major components include a universal asynchronous receiver transmitter 120 which directly communicates with the modem 20. The universal asynchronous receiver transmitter (hereinafter UART) has a number of data output lines 101, there being an output line 101 for each bit in a control word. A typical UART is Texas Instrument's TMS6011. The data lines 101 are connected to the address comparator 121, the check circuit 122 and the address decode and data drivers 123. The address decode and data drivers make the received data available to one of the buffer storage devices 30 as they are made available from UART 120.

On the transmit side when an address comparison is detected by the address comparator 121 the START TRANSMIT signal is provided to the transmit logic and control 130. This initiates the transmit sequence. The transmit logic and control 130 cooperates with the multiple input OR gate 135, an address register 140 and a check generator 150 as well as with the input modules 40 to provide UART 120 with the proper address and indication bits from which to transmit a message through modem 20 to the control office 10.

Before describing the operation in detail we will describe the components as illustrated in FIG. 2a. In addition to the foregoing the UART 120 provides a control signal, via line 125 to control means 126. A signal is present on this line each time a complete word has been received. Control means 126 provides a signal, via line 124, to UART 120, indicating that the data which has been presented, has been utilized. The control means 126 includes a number of counters and flip-flops which will become apparent as this description procedes.

On the first received word, which comprises the address, the control means 126 enables address comparator 121. Address comparator 121 compares the bits on data lines 101 with an address which has previously been fed in into the address switches 127. If a comparison is indicated comparator 121 provides the signal START TRANSMIT to transmit logic and control 130 and also provides an indication to the control means 126.

Assuming address comparison is indicated the modem controller assumes that the remaining words received are control words. Therefore, the next time a signal is available from UART 120 over line 125, it is made available to the control word counter 128 along with the signal COUNT CONTROL WORD from control means 126. This, and succeding signals from line 125 are counted by the control word counter 128. The output of the counter, provided to address decode and drivers 123, is decoded and provides the address and module select signals which form the output of the address decode and data drivers 123.

Each bit position in each of the control words is assigned a unique location in a first memory means. Therefore merely counting control words and bit locations within a control word allows address signals to be generated to route the control bits to the proper memory location. In addition, the control word counter compares its count with the number of control words pre-set by control word switches 129. When the counts compare the control word counter 128 makes available the signal LAST CONTROL WORD to the control 126.

As has been explained above, a polynominal check is provided for both control and indication transmissions. In the broadest sense, the polynominal check apparatus monitors the transmitted data and appends a check word or words to the transmitted message. When the message is received an equivalent check circuit monitors the received message and generates its own check word or words. The check word or words are then compared with the received check word or words, and if they match the message is considered valid. In order to operate effectively, check circuit 122 monitors the received data from UART 120. After the last control word has been received the control word counter 128 does not provide the address module select signals and therefore the subsequent words, which constitute the check word or words are not provided to the buffer storage driver unit 30. They are, however, monitored by the check circuit 122 which, at the conclusion provides a signal CHECK OUTPUT to the transmit logic and control 130. The use of this signal will become clear hereinafter.

On the transmit side the reception of the START TRANSMIT signal by transmit logic and control 130 initiates the transmission sequence. A first signal SEND ADDRESS enables OR gate 135 to make available to the transmit side of UART 120 the contents of address switches 140 which are set to the field station address. The same data signals, that is from address switches 140, is also made available to the check generator 150 to initiate it into operation in order to derive the check word or words for transmission along with the indication message. For the next word the transmit logic and control 130 sends the signal SEND INDICATION along with a module select signal to enable a first of the input modules to provide indications to the OR gate 135. The same indications are provided to the check generator 150 to enable it to continue the generator of the check word or words which will be appended to the transmission. For subsequent transmission of indication words the same signals are provided, one for each of the indication words to be transmitted, and a different input module select signal is provided to enable a different one of the input modules 40. Each indication word, in addition to passing through OR gate 135 is also provided to check generator 150 to continue the generation of the check word or words. After a number of indication words have been transmitted, as controlled by a counter in the transmit logic and control 130 the next control to OR gate 135 is CHECK A this allows the first check word which is now available in check generator 150 to be transmitted through OR gate 135 to the transmit side of UART 120 for transmission back to the control office. Likewise, CHECK B enables the second check word from check generator 150 to be provided to UART 120 through OR gate 135. Those with ordinary skill in the art will understand that one or more check words can be transmitted by so structuring the generator 150 and the transmit logic and control 130 to provide the necessary controlling signals.

The polynomial check apparatus referred to herein, including check generator 150 and check circuit 122 is well known to those skilled in the art. Typical apparatus to perform this function is the Motorola MC 8503 universal polynomial generator disclosed in Motorola data sheet 9285 (1973).

The system clock 155 provides timing signals to control 126 and to transmit logic and control 130, slower timing signals are provided through divider 156 to the UART 120.

During reception of a control message the UART 120 is capable of detecting certain errors such as an over-run error, a parity error or a framing error. If any of these errors are detected the transmit logic and control 130 is provided with a signal indicating that fact, and indicating which of these errors has occurred. In addition, a check circuit 122, at the conclusion of a control message reception, provides a polynomial error signal to the transmit logic and control 130 indicating whether or not the polynomial check was successful.

Figure 2B:
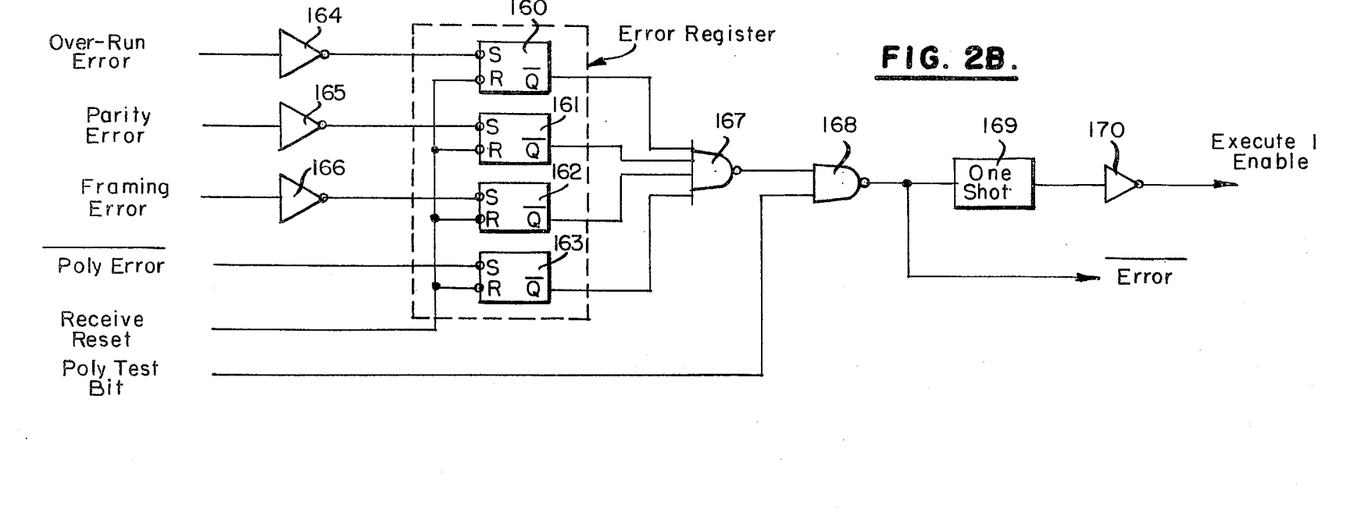

FIG. 2b is a detail block diagram of the error register and associated components contained in the transmit logic and control 130. The error register per se comprises four flipflops 160-163. The over-run error signal is provided to the set input of flipflop 160 through inverter 164. The parity error signal is supplied to the set input of flipflop 161 through inverter 165. A framing error signal is provided to the set input of flipflop 162 through inverter 166. Finally, the polynomial error input, in negative logic, is applied to the set input of flipflop 163. A receive reset signal is provided to reset each of flipflops 160 through 163. A NAND gate 167 receives the Q output of each of the flipflops 160 through 163. The output of NAND gate 167 is one input to NAND gate 168. The second input NAND gate 168 is POLY TEST BIT.

The production of receive reset and POLY TEST BIT will be discussed hereinafter. The output of NAND gate 168 is the $\overline{\text{ERROR}}$ signal. The same signal provides the input to a one shot 169 whose output is fed through inverter 170 and constitutes the EXECUTE ONE ENABLE signal. Before describing the operation of the apparatus of FIG. 2b we will discuss the apparatus of FIG. 2c.

Figure 2C:
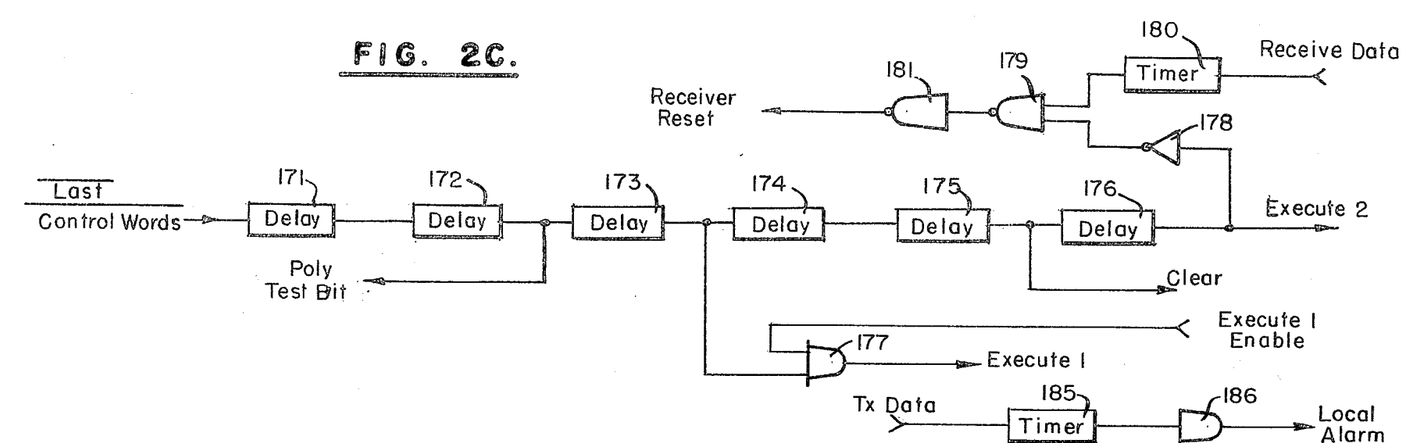

FIG. 2c illustrates another portion of the transmit logic and control 130. In particular, the signal LAST CONTROL WORD is provided to a series connected six segment delay unit comprising delays 171 through 176. From the description which follows those of ordinary skill in the art will understand that the delays provided by each of the delay units 171 through 176 are not equal. Furthermore, each of the delay units 171 through 176 may comprise a one shot or equivalent apparatus. The output of delay unit 172 comprises the signal POLY TEST BIT. The output of delay unit 173 is provided to an AND gate 177, the other input to AND gate 177 is the signal EXECUTE ONE ENABLE which is available from inverter 170 (FIG. 2b). The output of delay unit 175 is the signal CLEAR. The output of delay unit 176 is EXECUTE TWO which is also provided to an inverter 178. The output of inverter 178 is provided to a NAND gate 179 the other input to NAND gate 179 is provided by a timer 180. The input to timer 180 is the signal RECEIVE DATA. The output of NAND gate 179 is provided to NAND gate 181 which produces the RECEIVE RESET signal.

Finally, an input TX DATA is provided to a timer 185 whose output is provided as an input to buffer 186. The output of buffer 186 comprises the LOCAL ALARM signal.

The apparatus of FIG. 2c operates in response to reception of a signal indicating that the last control word has been received. After the delay encountered in delay units 171 and 172 the POLY TEST BIT is produced. After the further dalay encountered by delay unit 173 an input is provided to AND gate 177. If that input is accompanied by the signal EXECUTE ONE ENABLE the AND gate produces the signal EXECUTE ONE. After the delays of delay units 174 and 175 the signal CLEAR is produced. And finally, after the delay of delay unit 176 a signal EXECUTE TWO is produced. The EXECUTE TWO signal operating through inverter 178 and NAND gates 179 and 180 produces the RECEIVE RESET signal. Alternatively, if data is not received for a short period of time, such as 16 milliseconds, which is the period of time 180, the RECEIVE RESET signal is also produced.

The timer 185 has a period which is on the order of magnitude of the communication cycle for the associated field station. That is the time taken by the central office between communications to the associated field station. If the particular field station does not transmit within the period of timer 185 it produces a signal to energize the local alarm through buffer 186.

Since a timer 185 at one field station is independent of timers at other field stations, they may be set to time different periods. For instance, if a first field station requires communications every 500 milliseconds a timer 185 is arranged to time out after that field station does not transmit within 500 milliseconds. Another field station may only require communications once every 3.5 seconds. Its associated timer 185 would therefore be arranged to time out after 3.5 seconds. In this manner the communication cycle and alarm conditions responsive thereto can be tailored for each individual station in a single system.

The LOCAL ALARM may be arranged to merely indicate the alarm condition or it can be arranged to act on the field station's application circuits such as by setting all signals to stop.

Furthermore the local alarm may also be arranged to shut down the field station transmitter. This is significant in that one failure mode of the system is a condition wherein the field station transmitter remains on. Of course this will tie up the communication channel. However, if the local alarm is arranged to shut down the field station transmitter this condition will last only until the local alarm comes on.

Figure 3A:
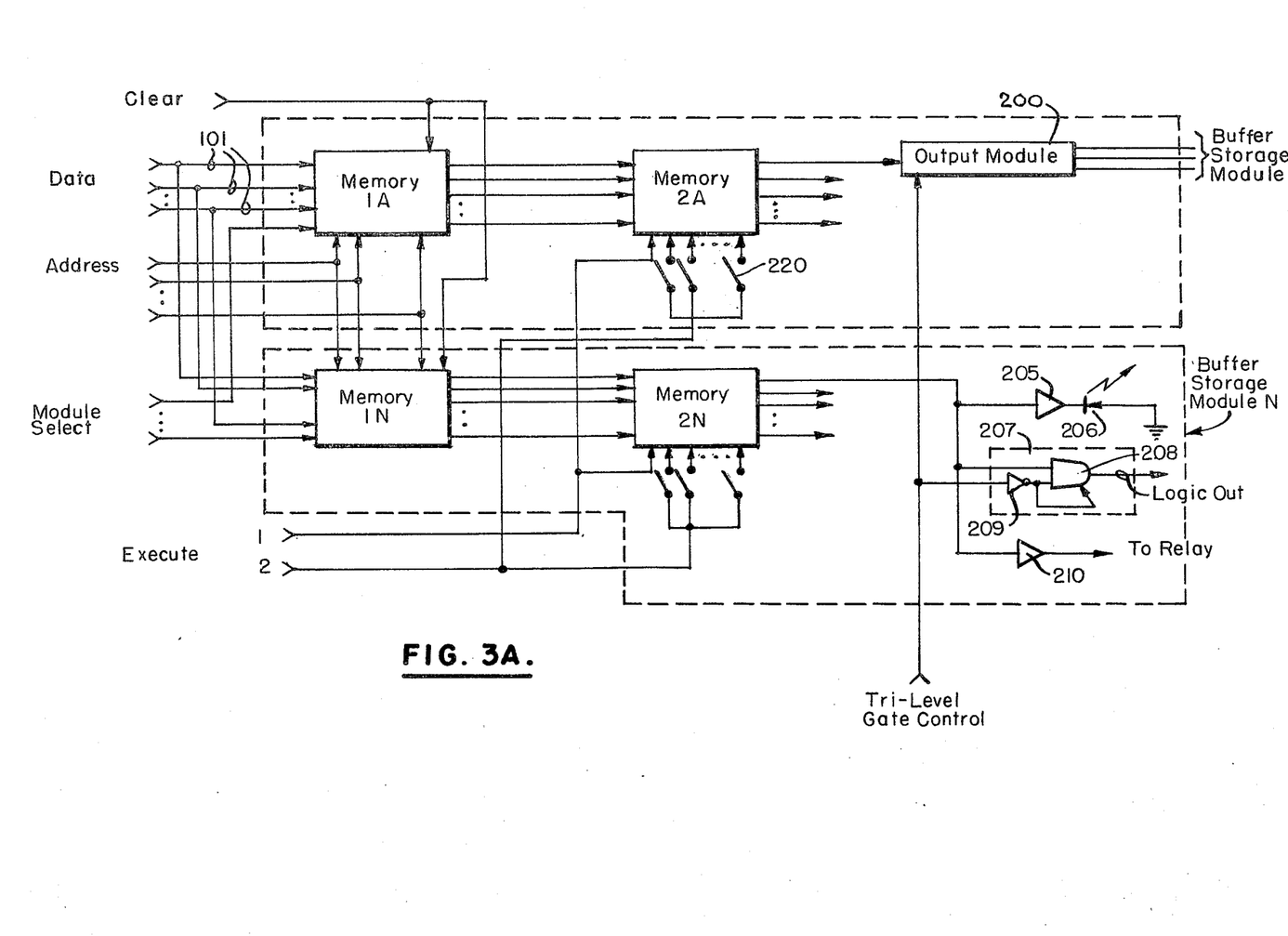
FIG. 3a is a detailed block diagram, part schematic, of the buffer storage of FIG. 1.

The signal EXECUTE ONE, CLEAR and EXECUTE TWO are utilized by the buffer storage module 30. FIG. 3a illustrates a detailed block diagram of a pair of buffer storage modules 30. Those of ordinary skill in the art will understand that a number of buffer storage modules 30 may be provided in accordance with the quantity of data to be received at any particular station.

One input to each of the buffer storage modules 1 and 2 is provided by the data lines 101. These lines are provided to the buffer storage modules through the address decode and data drivers 123. The data lines 101 are connected to a first memory means in each of these modules.

In an embodiment built in accordance with the principles of our invention each control word comprised eight control bits. Therefore there are eight data lines 101 provided to a first memory means in each of the buffer storage modules. Each first memory means comprises a 64 bit solid state memory arranged to store eight words of eight bits each. First memory means provides 64 outputs to a second memory means, in each buffer storage module. The address inputs for each first memory means as well as the module select signals for each first memory means are provided by the address decode and data drivers 123. This information is derived from the output of control word counter 128 (FIG. 2a). In normal operation, the first control word would be directed to the first word of first memory means, the second control word is directed to the second word of the first memory means, etc. Since the first memory means 1a is capable of storing the equivalent of eight control words, subsequent control words are, therefore, directed in turn to first memory means 1b etc. Those with ordinary skill in the art will understand that the memory capacity to store an entire control message may be arranged in a variety of ways.

As a control word is received and made available by UART 120 it is directly available to the address decode and data drivers 123 and, there through, to a particular one of the first memory means. Thus, the control bits are stored in a selected first memory means in substantial time synchronism with the receipt thereof. As soon as control information is stored in a first memory means it is available to the associated second memory. However, the data provided by a first memory is not entered into a second memory until the EXECUTE ONE signal is provided. The EXECUTE ONE signal is simultaneously provided to each storage location in a second memory such that an entire 64 bit transfer is made from a first memory to a second memory on the occurance of EXECUTE ONE. As soon as the data is transferred to a second memory it is available through the output module 200 to the application circuits at the field station. For each bit location of a second memory an output module 20 provides three different outputs. A typical output module comprises an amplifier 205 and LED 206 connected serially between the bit location and ground. In addition, the particular bit location provides a logic input to a tri-level gate 207. The tri-level gate comprises and AND gate 208, which receives the logic input and provides the output, and an inverter 209 which provides another input to the AND gate 208. The input to inverter 209 is derived from the tri-level gate control which is common to each of the tri-level gates 207 of the output module 200. Finally, amplifier 210 also receives the input from the associated bit location and is capable of driving a relay in an application circuit.

A CLEAR input signal is also provided to each bit position of each first memory.

An EXECUTE TWO input is also provided to each second memory. THE EXECUTE TWO is applied to each second memory through a plurality of switches 220. While there may be a single switch 220 for each bit position in each second memory we have found it convenient, for purposes of distribution of the EXECUTE TWO signal, to organize each second memory into eight groups of eight bits each. Each of the eight groups of eight bits of the second memory is provided with the EXECUTE TWO signal over a different switch 220. Therefore, for each second memory there are eight switches 220. The switches 220 may be electronic switches, but we have found that electo-mechanical switches are satisfactory.

In operation, the buffer storage module operates as follows. As each control word is received it is made available to a first memory and stored therein, in substantial time synchronism with its receipt by UART 120. At the conclusion of any control message, therefore, a number of bit positions in a first memory or memories may be filled with a data reflecting the controls.

At the time the last control word is received a signal is provided to the delay unit 171 (FIG. 2c). After the delay of unit 171 and the delay encountered in unit 172 the POLY TEST BIT is produced.

Assuming that the polynomial check was successful, i.e., no error was detected, and further assuming that no framing error, parity error or over-run error was detected by UART 120, each of the flipflops 160 and 163 would be reset. The resulting high output of each $\bar{Q}$ would provide a low output of NAND gate 167. The occurance of the POLY TEST BIT would not change the high output of NAND gate 168. As a result, the EXECUTE ONE ENABLE signal is present. If, anyone of the errors had been detected, the respective flipflop would have been set. Accordingly, the respective $\bar{Q}$ output would be low which would result in a high output of NAND gate 167. Thus, when the POLY TEST BIT occurred, NAND gate 168 would provide a low output which would initiate the one shot 169 and would result in the removal of EXECUTE ONE ENABLE.

Referring again to FIG. 2c we see that when the last control word signal has traversed delay unit 173 it enables AND gate 177. If, at that time, EXECUTE ONE ENABLE is available, the signal EXECUTE ONE is produced. In like manner, of course, if at the time AND gate 177 receives a signal from delay unit 173, EXECUTE ONE ENABLE is not present, then EXECUTE ONE will not be produced.

Figures 2D, 3B, 3C:
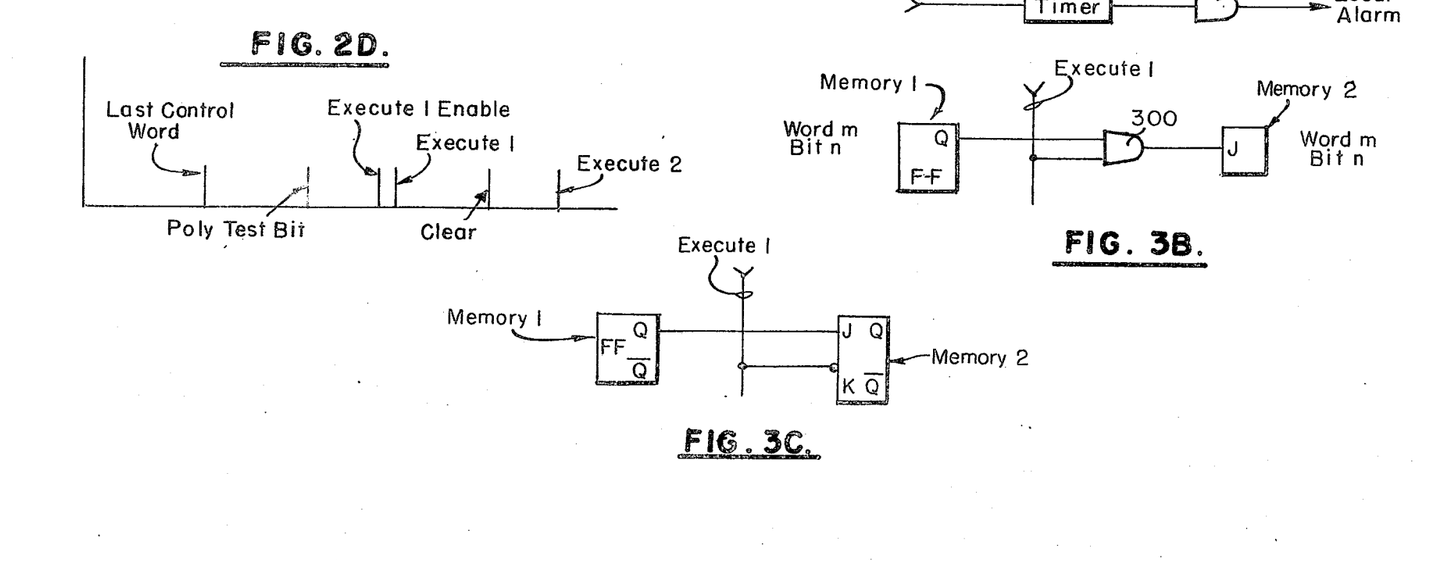

After a further delay occasioned by delay units 174 and 175 a signal CLEAR is produced and finally, after a further delay occasion by delay unit 176, EXECUTE TWO is developed. The time relationship between these signals is represented in FIG. 2d. The inverter 178, and NAND gates 179 and 181 produce the RECEIVE RESET which, acting upon the flipflops 160 through 161 causes them to be set for further reception.

Referring now to FIG. 3a we can see the effect the signals just produced has on the apparatus illustrated there. The occurance of LAST CONTROL WORD produces the POLY TEST BIT. This signal, assuming no errors have been detected, provides EXECUTE ONE ENABLE which results in EXECUTE ONE. EXECUTE ONE allowed the controls, previously stored in a first memory, to be transferred to a second memory. At the point the controls are transferred to a second memory, the control bits become available to the application circuits. Sometime subsequent to EXECUTE ONE, CLEAR is produced which clears each first memory and ensures that each bit position will be in a logic zero level. Subsequent to CLEAR, EXECUTE TWO is produced. EXECUTE TWO is selectively provided to memory locations of a second memory. Of course, for those bit locations in a second memory, which do not receive EXECUTE TWO, its production will have no effect. However, for those bit positions of a second memory which receive the EXECUTE TWO signal, the following will take place. The contents of a corresponding bit position in a first memory will be transferred to second memory. However, since the first memory had been cleared to a logic zero by CLEAR, any corresponding bit location in a second memory will also be cleared to a logic zero. This particular location then may provide a pulse type output in that, had the corresponding bit position been in a logic one state, the occurance of EXECUTE TWO would terminate that condition. Thus, the logic one output from that particular bit position of a second memory is available in the period between EXECUTE ONE and EXECUTE TWO. By varying the delays, that is the delay in units 174, 175 and 176, the duration of the "pulse" output can be increased or decreased. By simply opening the associated switch 220, the pulse type output can be altered to be of the latch type.

Those with ordinary skill in the art will understand that it would be within the scope of our invention to provide a separate switch 220 for each bit position in the second memory, if desirable, so that the pulse or latch output could be separately selected for each individual bit position. The manually operated switches 220 have the advantage of low cost and reliability, however they must be manually operated to change their condition. If desirable these could be replaced by relay contacts or electronic switches which are controlled by the received data, for instance. In such an arrangement the selection of which outputs are pulse and which are latch could be made by the control office and could be varied from one transmission to the next.

FIGS. 3b and 3c illustrate two embodiments showing the connection of a first memory bit position to a second memory bit position. In FIG. 3b each bit position of a second memory comprises a non-clocked flipflop or equivalent static device. Each bit position of a first memory may comprise such a flipflop. An AND gate 300 connects the output of a bit position in a first memory to the input of a bit position in the second memory. A second input to the AND gate 300 is provided by EXECUTE ONE. Those of ordinary skill in the art will understand that in the absence of EXECUTE ONE the condition of the first memory flipflop will have no effect on the second memory storage device. However, when EXECUTE ONE is present, the first memory storage device will control the second memory storage device.

FIG. 3c illustrates another embodiment in which each bit position of a second memory comprises a clocked flipflop or equivalent electronic device. The output of a first memory flipflop is provided to the input of the second memory flipflop and the EXECUTE ONE signal is provided on the clocking input. Until the EXECUTE ONE signal clocks the flipflop of the second memory, the second memory flip-flop will not respond to the condition of the first memory flipflop.

Now that we have explained the manner in which each of the plurality of second memory's has been loaded we will describe the output of the interface, i.e., the connection between the second memory and an application circuit. For each bit position of the second memory three outputs are available.

The first output is in the form of a light signal provided by LED 206. A second output is capable of energizing a relay via amplifier 210. A third, and logic level output is provided by the tri-level gate 207. The tri-level gate 207 has three states. Assuming that the tri-level gate control is enabled the condition of the associated bit position of the second memory will control the logic one or logic zero level of AND gate 208. However, if the tri-level gate control is inhibited, the AND gate 208 will exhibit a high impedance state. In this state the output of AND gate 208 may be directly connected to the output of another logic element and the AND gate 208 will not adversely affect the remaining portion of the application circuit. For an example of the usefulness of this capability reference is now made to FIG. 4.

Figure 4:
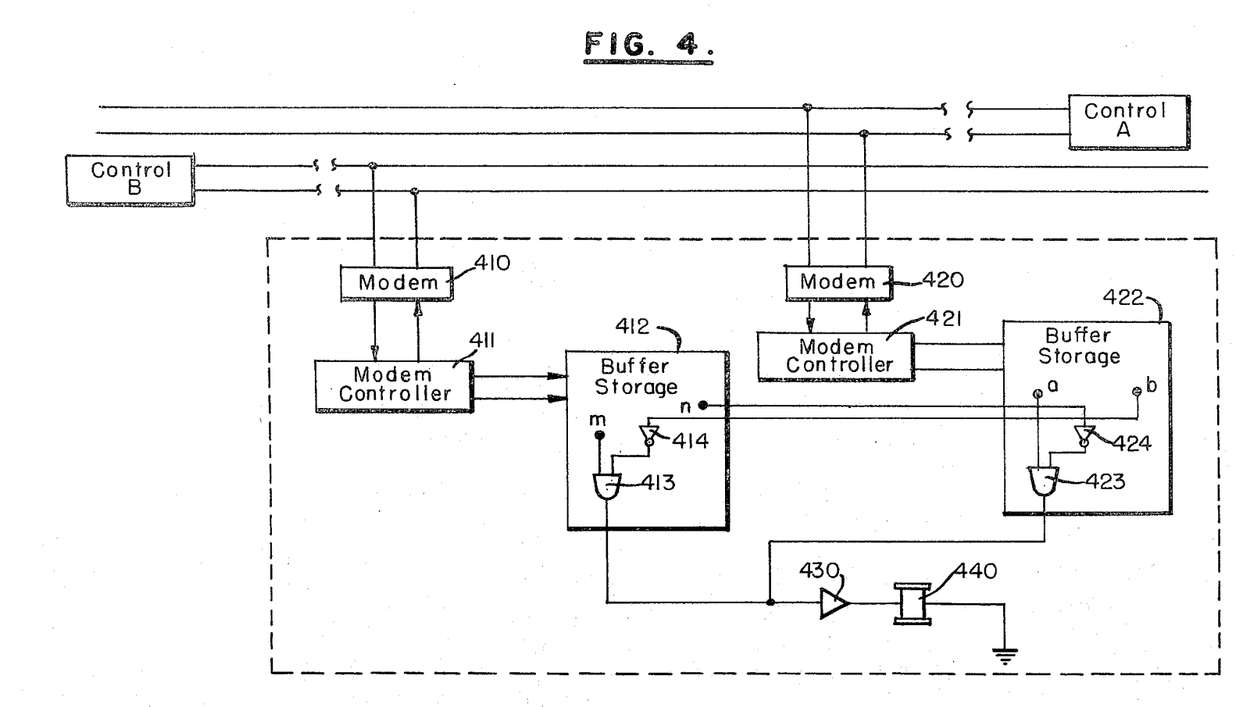
FIG. 4 is a part block part schematic diagram of a embodiment of the present invention.

FIG. 4 illustrates a control office A and control office B. In normal practice the control offices referred to would be at separate geographic locations. A field station includes a modem 410 and another modem 420. Modem 420 is controlled from control office A while modem 410 is controlled by control office B. A modem controller 411, such as a modem controller 100 shown in FIG. 1, provides a communication path between the modem 410 and a buffer storage 412. Similarly, a modem controller 420 provides a conduit for communication to buffer storage 422. As shown in FIG. 4 buffer storage 412 has one logic output, or bit position *m* connected as logic input to a tri-level gate including an AND gate 413. Similarly, buffer storage 422 has a bit position *a* which provides the logic input to a tri-level gate including AND gate 423. A second bit position *b*, of buffer storage 422 provides an input to the inverter 414 of a tri-level gate in buffer storage 412. Likewise, another bit position *n* of buffer storage 412 provides an input to inverter 424 of a tri-level gate included in buffer storage 422. The outputs of the respective tri-level gates are connected to an amplifier 430 which drives a relay 440.

In operation, assuming that control office A desires to control the condition of relay 440 it would transmit a control in the *a* bit position of a control message to enable AND gate 423. At the same time, in the bit position *b* of the same control message it would provide a control to disable the tri-level gate output in buffer storage 412. As a result, the high impedance state of AND gate 413 would not affect the operation of AND gate 423 in controlling the the relay 440.

Of course, if control office B desired to control relay 440 it could send controls such as that disclosed above, with reference to its bit position *m* and *n*. It should be apparent, for instance, that when control office B is in control the logic condition of the corresponding bit position in buffer storage 422 would have no affect on the proper operation of the application circuit including the relay 440.

There are many different arrangements that can be provided to fulfill the functions of the control office 10. One such an arrangement is illustrated in block diagram form in FIG. 5A, and in more detail form in FIG. 5B.

Figures 5A, 5B:
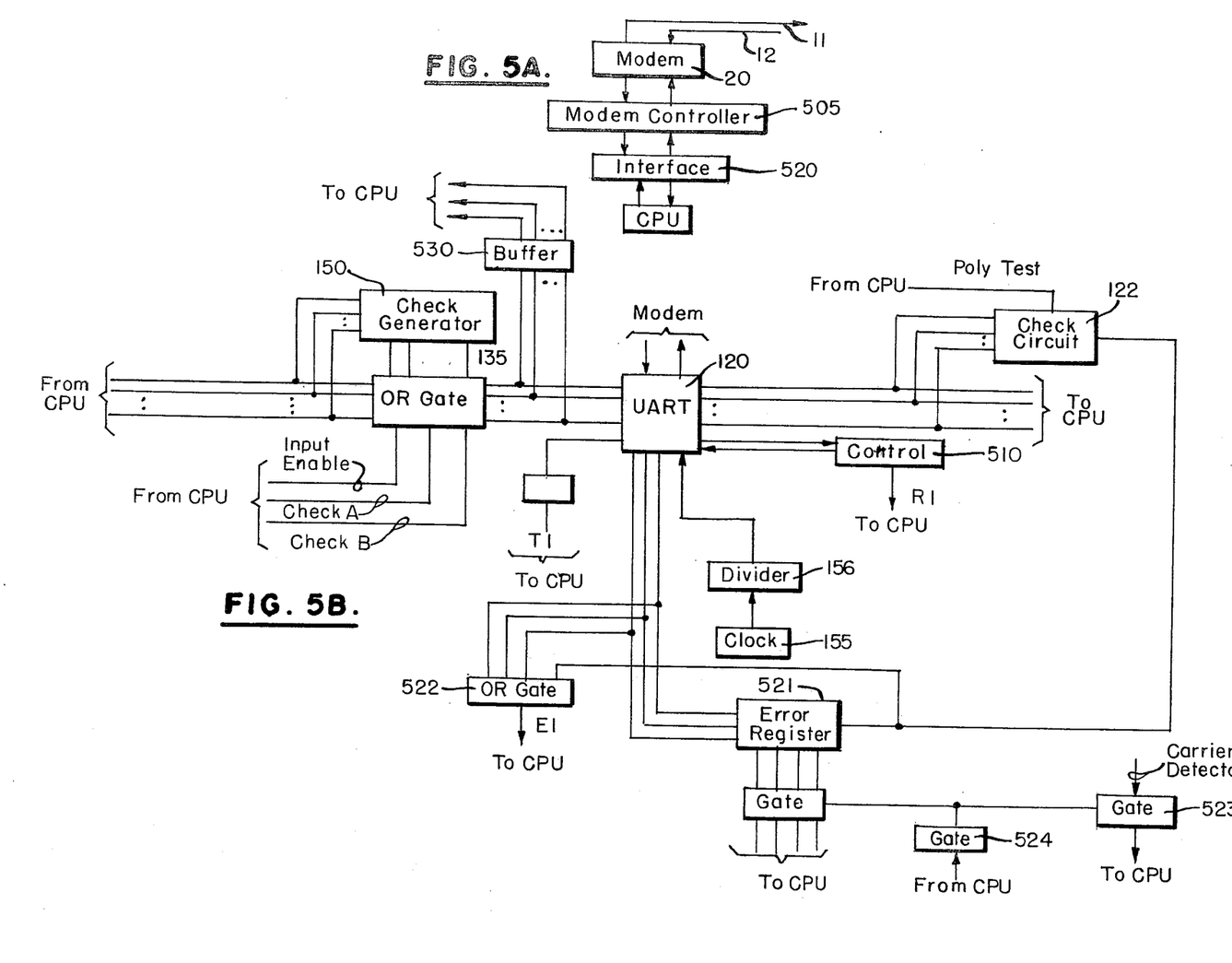
FIGS. 5A and 5B are block diagrams of control office equipment in accordance with our invention.

FIG. 5A illustrates the components located at the central office 10. They include a modem 20 connected to the communication channels 11 and 12, a modem controller 505 which transmits through an interface 520 to a central processing unit 500. The central processing unit 500, in turn, can provide information through the interface 520 to the modem controller 505. The central processor 500 controls the operation of the communication system and may comprise a standard digital data processing unit such as a Nova mini-computer. Input and output connections may be made to the central processing unit 500 with other peripheral equipment such as a key board, CRT/or other displays, which are not illustrated. In addition, the central processing unit 500 is provided with a suitable program in order to operate effectively. Such a program forms no part of our invention. The central processing unit 500 initiates operations by transmitting, word by word a message to the modem controller. In order to communicate with a specified field station the first word of the message is an address; the address of the field station with which communications are desired. Subsequent words of the message may comprise control words. The check word or words which conclude the message are added by the modem controller 505 and the entire message is transmitted, word by word through modem 20 on one of the communication channels. When a station recognizes its address it sends its address back on the other communication channel along with indication words. This data is received in the modem controller 505. As each word is received it is stored in the CPU memory. The modem controller 505 also provides the CPU with information indicating the status of the communication cycle. In addition, the modem controller 505 can pass to the CPU 500 error indications and the like.

FIG. 5B illustrates in further detail the components of the modem controller 505 and the manner in which communications take place between the modem controller 505 and the CPU 500. The modem controller 505 is, in many respects, similar to the modem controller 100 referred to earlier. However, since the CPU 500 is available most of the decision making and storage capability required at the control office are provided by the CPU 500 and thus are relieved from the modem controller 505. The modem controller 505 includes a UART 120 which provides received data to the CPU interface 520. The data received by a UART 120 is also provided to a check circuit 122 which may be identical to the check circuit 122 referred to previously. When the UART 120 detects reception it provides a signal to a control means 510 indicating that fact. Control means 510 in turn, provides a RECEIVE INTERRUPT signal to the CPU 500. After a predetermined delay in control 510, control 510 will provide the UART 120 with a indication that the data has been received. The UART 120 operates under control of a clock 155 through a divider 156. UART 120 also provides error information, such as parity errors, overrun errors and framing errors, when any are detected to an error register 521. When the check circuit 122 detects a polynomial error it provides a signal indicative thereof to the same error register 521. When any of the aforementioned errors are detected a signal is provided, through OR gate 522 as an ERROR INTERRUPT to the central processing unit 500. The modem 20 provides a carrier detector signal when a field station carrier is detected on the line to a gate 523. In some circumstances, the presence of a field station carrier on the communication line may be an error. When the central processing unit desires to determine which of a possible error conditions exist it interrogates a gate 524 which allows the error information to be transmitted to the central processing unit 500. As was the case with the field stations check circuit 122, the check circuit 122 in the central office 10 provides a signal indicating polynomial error on the occurance of a POLY TEST signal. In the case, however, of the control office, the CPU provides the POLY TEST signal.

On the transmitter side, when the CPU desires to transmit a message it communicates the message one word at a time, to the modem controller. It also provides controlling signals, INPUT ENABLE, CHECK A and CHECK B to OR gate 135. The check generator 150 monitors the word and generates the check word or words necessarily appended to the message. The first word supplied by the central processing unit in providing a message is an address of the field station to which the message is addressed, as well as the plurality of control words. At the conclusion of control words the check generator 150, in the presence of CHECK A or CHECK B provides OR gate 135 with the check word. OR gate 135 communicates the address, controls or check words to UART 120 which causes them to be transmitted through the modem. As each word is transmitted a signal is provided to a gate which provides a TRANSMIT INTERRUPT signal to the central processing unit. This allows the central processing unit to check the transmitted word against the word that it desired to transmit. This is effected, when a TRANSMIT INTERRUPT is enabled by directing the data that has just been transmitted back to the CPU. More particularly messages made available by CPU 500 are directed through OR gate 135 to UART 120. A buffer 530 stores the word that is fed from OR gate 135 to UART 120 so that when a TRANSMIT INTERRUPT occurs the CPU may receive the word for checking purposes.

What we claim is:

1. A telemetry and control system including a master station and a plurality of field stations interconnected by a single duplex transmission link including a first transmission channel carrying transmissions from said master station and a second transmission channel carrying transmissions from said field stations for regularly receiving transmissions at said field stations in which at least one of said field stations responds to a failure in said system to allow preventive action to be taken at said field station to prevent said field station from tying up said second transmission channel, comprising,
   a receiver at said field station responsive to transmissions on said first transmission channel,
   a transmitter at said field station for transmitting indications on said second transmission channel when enabled by said receiver,
   timing means, at said field station reset in response to each enablement of said transmitter by said receiver, said timing means becoming set in the absence of enablement of said transmitter for a predetermined timing period, and alarm means, at said field station, controlled by said timing means when set for indicating a failure of said system.

2. The system of claim 1 in which each of a plurality of said field stations respond to a failure of said system, each of said plurality of field stations having identification means cooperating with said receiver for allowing said receiver to respond only to reception of transmissions corresponding to said identification means.

3. The apparatus of claim 2 in which said transmitter is operated to transmit indications only in response to reception of a transmission of said receiver.

4. The apparatus of claim 2 in which said timing means at each of said plurality of stations may respond to lack of transmission for different predetermined periods.

5. A telemetry system including at least a single remote station capable of responding to controls originating at mutually independent locations, said remote station including a receiver and an out ut module controlled by said receiver for making received data available for controlling utilization apparatus,
said output module including a tri-level gate operable to three distinctive conditions,
said output module having two inputs for controlling said tri-level gate,
a first input connected to be responsive to said receiver, said tri-level gate operative to two of said three distinctive conditions depending on said first input, and
a second input for controlling said tri-level gate to its third distinctive condition.

6. The apparatus of claim 5 in which said telemetry system includes a first and second control office for transmitting data,
said first control office transmitting to said receiver, a second receiver controlled by said second control office, said second receiver including a second output module
said second input connected to said second output module.

7. A telemetry and control system including a plurality of field stations responsive to data respresenting control signals transmitted over a transmission channel which is adapted to selectively provide constant control signals or control signals or predetermined duration comprising,
a receiver connected to said transmission channel,
first and second memory means each with a plurality of locations and transferring means
controlled by said receiver, said first memory means connected to said receiver for storing data received thereby,
said transferring means transferring said data from said first memory means to said second memory means a first predetermined time after receipt of said data,
and means for clearing selected locations of said second memory means a second predetermined time after operation of said transferring means,
whereby said selected locations may provide outputs of second predetermined time duration and unselected locations may provide constant outputs.

8. The apparatus of claim 7 wherein said means for clearing includes,
means for clearing all locations of said first memory means,
second transferring means selectively connecting coordinate locations of said first and second memory means, and
enabling means operating said second transferring means said second predetermined time after operation of said transferring means.

9. The apparatus of claim 7 in which said means for clearing includes separate switching means for each plurality of locations of said second memory means,
each said switching means having two states for connecting or disconnecting said clearing means to each plurality of locations of said second memory means.

10. The apparatus of claim 9 in which each said switching means comprises a manually operated switch.

11. The apparatus of claim 8 in which said second transferring means includes separate switching means for each plurality of locations of said second memory means,
each said switching means having two states for connecting or disconnecting coordinate locations of said first and second memory means.

12. The apparatus of claim 11 in which each said switching means comprises a manually operated switch.

13. The system of claim 1 in which said alarm means control at least one application circuit at said field station.

14. The system of claim 1 in which said alarm means disables said transmitter.

15. A telemetry and control system including a master station and a plurality of field stations interconnected by a single duplex communication link in which field stations transmit to said master station in response to reception of messages from said master station, an improvement for disabling a transmitter at a field station to prevent such transmitter's failure from preventing transmissions by other field stations comprising:
a master station with a transmitter and receiver,
a plurality of field stations each with a transmitter and receiver,
said master station transmitter coupled to field station receivers and said field station transmitters coupled to said master station receiver over said single duplex communication link,
means at each field station, responsive to reception of a transmission directed to it, to enable said field station's transmitter,
timing means at each said field station coupled to said means for enabling and reset by said means for enabling, said timing means timing out a predetermined period and thereafter becoming set in absence of a resetting signal within said predetermined period, and
alarm means at each said field station, energized by said timing means, when set to disable said field station's transmitter,
whereby failure of a field station transmitter in a transmitting condition is cured, after said predetermined period by disabling said failed transmitter.

16. The apparatus of claim 15 wherein said predetermined period of said timing means at any field station is independent of said predetermined period of timing means at other of said field stations.

17. The apparatus of claim 15 which includes utilization apparatus at each said field station, each field station receiver
coupled to associated utilization apparatus, and means responsive to energization of said alarm means for controlling said associated utilization apparatus.

* * * * *